United States Patent
Feblowitz et al.

(10) Patent No.: US 9,286,032 B2
(45) Date of Patent: Mar. 15, 2016

(54) AUTOMATED SOFTWARE COMPOSITION

(71) Applicant: INTERNATIONAL BUSINESS MACHINES CORPORATION, Armonk, NY (US)

(72) Inventors: Mark D. Feblowitz, Winchester, MA (US); Nagui Halim, Yorktown Heights, NY (US); Anton V. Riabov, Ann Arbor, MI (US); Anand Ranganathan, Stamford, CT (US); Shirin Sohrabi Araghi, White Plains, NY (US); Octavian Udrea, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 155 days.

(21) Appl. No.: 13/836,645

(22) Filed: Mar. 15, 2013

(65) Prior Publication Data
US 2014/0282359 A1    Sep. 18, 2014

(51) Int. Cl.
*G06F 9/44* (2006.01)

(52) U.S. Cl.
CPC .. *G06F 8/10* (2013.01); *G06F 8/20* (2013.01); *G06F 8/35* (2013.01); *G06F 8/36* (2013.01)

(58) Field of Classification Search
CPC .............. G06F 8/10; G06F 8/35; G06Q 10/04
USPC ......................................... 717/104, 107, 152
See application file for complete search history.

(56) References Cited

U.S. PATENT DOCUMENTS

| | | |
|---|---|---|
| 4,571,678 A | 2/1986 | Chaitin |
| 5,159,685 A | 10/1992 | Kung |
| 5,187,788 A | 2/1993 | Marmelstein |
| 5,657,428 A | 8/1997 | Tsuruta et al. |
| 5,659,754 A | 8/1997 | Grove et al. |
| 5,675,757 A | 10/1997 | Davidson et al. |
| 5,675,805 A | 10/1997 | Boldo et al. |
| 5,696,693 A | 12/1997 | Aubel et al. |
| 5,937,195 A | 8/1999 | Ju et al. |
| 5,999,729 A | 12/1999 | Tabloski, Jr. et al. |
| 6,032,142 A | 2/2000 | Wavish |
| 6,053,951 A | 4/2000 | McDonald et al. |
| 6,339,783 B1 | 1/2002 | Horikiri |
| 6,347,320 B1 | 2/2002 | Christensen et al. |
| 6,430,698 B1 | 8/2002 | Khalil et al. |
| 6,601,112 B1 | 7/2003 | O'Rourke et al. |
| 6,665,863 B1 | 12/2003 | Lord et al. |

(Continued)

OTHER PUBLICATIONS

Rao et al., "A Survey of Automated Web Service Composition Methods," Springer-Verlag, 2005, 12pg.*

(Continued)

*Primary Examiner* — Ryan Coyer
(74) *Attorney, Agent, or Firm* — F. Chau & Associates, LLC (57) ABSTRACT

A method for automated composition of an application including: receiving a customizable template for application composition and a composition goal, wherein the goal comprises a plurality of tags and the goal is incomplete such that more than one possible composition matches the goal; refining the goal by automatically adding refinement tags to the goal; and generating an application flow that matches the customizable template and the refined goal, wherein the application flow comprises data sources, data processing operators, and outputs of the application flow.

21 Claims, 6 Drawing Sheets

(56) References Cited

U.S. PATENT DOCUMENTS

| | | |
|---|---|---|
| 6,721,747 B2 | 4/2004 | Lipkin |
| 6,792,595 B1 | 9/2004 | Storistenau et al. |
| 6,799,184 B2 | 9/2004 | Bhatt et al. |
| 6,813,587 B2 | 11/2004 | McIntyre et al. |
| 6,851,105 B1 | 2/2005 | Coad et al. |
| 6,891,471 B2 | 5/2005 | Yuen et al. |
| 6,983,446 B2 | 1/2006 | Charisius et al. |
| 7,000,022 B2 | 2/2006 | Lisitsa et al. |
| 7,062,762 B2 | 6/2006 | Krishnamurthy et al. |
| 7,103,873 B2 | 9/2006 | Tanner et al. |
| 7,164,422 B1 | 1/2007 | Wholey, III et al. |
| 7,174,536 B1 | 2/2007 | Kothari et al. |
| 7,222,182 B2 | 5/2007 | Lisitsa et al. |
| 7,231,632 B2 | 6/2007 | Harper |
| 7,263,694 B2 | 8/2007 | Clewis et al. |
| 7,290,244 B2 | 10/2007 | Peck et al. |
| 7,334,216 B2 | 2/2008 | Molina-Moreno et al. |
| 7,409,676 B2 | 8/2008 | Agarwal et al. |
| 7,426,721 B1 | 9/2008 | Saulpaugh et al. |
| 7,466,810 B1 | 12/2008 | Quon et al. |
| 7,472,379 B2 | 12/2008 | Chessell et al. |
| 7,499,906 B2 | 3/2009 | Kloppmann et al. |
| 7,536,676 B2 | 5/2009 | Baker et al. |
| 7,543,284 B2 | 6/2009 | Bolton et al. |
| 7,565,640 B2 | 7/2009 | Shukla et al. |
| 7,614,041 B2 | 11/2009 | Harper |
| 7,627,808 B2 | 12/2009 | Blank et al. |
| 7,639,726 B1 | 12/2009 | Sinsuan et al. |
| 7,657,436 B2 | 2/2010 | Elmore et al. |
| 7,681,177 B2 | 3/2010 | LeTourneau |
| 7,685,566 B2 | 3/2010 | Brown, Jr. et al. |
| 7,716,167 B2 | 5/2010 | Colossi et al. |
| 7,716,199 B2 | 5/2010 | Guha |
| 7,730,467 B1 | 6/2010 | Hejlsberg et al. |
| 7,756,855 B2 | 7/2010 | Ismalon |
| 7,769,747 B2 | 8/2010 | Berg et al. |
| 7,773,877 B2 | 8/2010 | Yang et al. |
| 7,792,836 B2 | 9/2010 | Taswell |
| 7,797,303 B2 | 9/2010 | Roulland et al. |
| 7,797,698 B2 | 9/2010 | Diament et al. |
| 7,809,801 B1 | 10/2010 | Wang et al. |
| 7,810,085 B2 | 10/2010 | Shinnar et al. |
| 7,814,123 B2 | 10/2010 | Nguyen et al. |
| 7,827,210 B2 | 11/2010 | Meliksetian et al. |
| 7,860,863 B2 | 12/2010 | Bar-Or et al. |
| 7,861,151 B2 | 12/2010 | Milic-Frayling et al. |
| 7,873,942 B2 | 1/2011 | Shaburov et al. |
| 7,877,387 B2 | 1/2011 | Hangartner |
| 7,882,485 B2 | 2/2011 | Feblowitz et al. |
| 7,886,269 B2 | 2/2011 | Williams et al. |
| 7,886,273 B2 | 2/2011 | Hinchey et al. |
| 7,900,201 B1 | 3/2011 | Qureshi et al. |
| 7,954,090 B1 | 5/2011 | Qureshi et al. |
| 7,958,148 B2 | 6/2011 | Barnes et al. |
| 7,982,609 B2 | 7/2011 | Padmanabhan et al. |
| 7,984,417 B2 | 7/2011 | Ben-Zvi et al. |
| 7,984,423 B2 | 7/2011 | Kodosky et al. |
| 7,992,134 B2 | 8/2011 | Hinchey et al. |
| 8,001,527 B1 | 8/2011 | Qureshi et al. |
| 8,032,522 B2 | 10/2011 | Goldstein et al. |
| 8,037,036 B2 | 10/2011 | Blumenau et al. |
| 8,046,737 B2 | 10/2011 | Wittenberg et al. |
| 8,078,487 B2 | 12/2011 | Li et al. |
| 8,078,953 B2 | 12/2011 | Kunz et al. |
| 8,086,598 B1 | 12/2011 | Lamb et al. |
| 8,122,006 B2 | 2/2012 | de Castro Alves et al. |
| 8,332,959 B2 | 12/2012 | Chen et al. |
| 8,429,758 B2 | 4/2013 | Chen et al. |
| 2002/0109706 A1 | 8/2002 | Lincke et al. |
| 2004/0015783 A1 | 1/2004 | Lennon et al. |
| 2004/0249664 A1 | 12/2004 | Broverman et al. |
| 2005/0096960 A1 | 5/2005 | Plutowski et al. |
| 2005/0097224 A1 | 5/2005 | Chen et al. |
| 2005/0125738 A1 | 6/2005 | Srivastava et al. |
| 2005/0125739 A1 | 6/2005 | Thompson et al. |
| 2005/0159994 A1 | 7/2005 | Huddleston et al. |
| 2005/0166193 A1 | 7/2005 | Smith et al. |
| 2005/0172306 A1 | 8/2005 | Agarwal et al. |
| 2005/0177406 A1 | 8/2005 | Facciorusso et al. |
| 2005/0192870 A1 | 9/2005 | Geddes |
| 2005/0222827 A1 | 10/2005 | Emek et al. |
| 2006/0168115 A1 | 7/2006 | Loupia et al. |
| 2006/0212836 A1 | 9/2006 | Khushraj et al. |
| 2006/0248467 A1 | 11/2006 | Elvanoglu et al. |
| 2006/0288055 A1 | 12/2006 | Johnson et al. |
| 2007/0033590 A1 | 2/2007 | Masuouka et al. |
| 2007/0043607 A1 | 2/2007 | Howard et al. |
| 2007/0112777 A1 | 5/2007 | Field et al. |
| 2007/0129953 A1 | 6/2007 | Cunningham et al. |
| 2007/0136281 A1 | 6/2007 | Li et al. |
| 2007/0162976 A1 | 7/2007 | Anderson et al. |
| 2007/0169052 A1 | 7/2007 | Vanrenen et al. |
| 2007/0190499 A1 | 8/2007 | Baur |
| 2007/0204020 A1 | 8/2007 | Anderson et al. |
| 2007/0208685 A1 | 9/2007 | Blumenau |
| 2007/0214111 A1 | 9/2007 | Jin et al. |
| 2007/0214171 A1 | 9/2007 | Behnen et al. |
| 2007/0214176 A1 | 9/2007 | Rao et al. |
| 2007/0244876 A1 | 10/2007 | Jin et al. |
| 2007/0244912 A1 | 10/2007 | Kawaguchi |
| 2007/0245298 A1 | 10/2007 | Grabarnik et al. |
| 2007/0250331 A1 | 10/2007 | Liu et al. |
| 2007/0282746 A1 | 12/2007 | Anke et al. |
| 2008/0005778 A1 | 1/2008 | Chen et al. |
| 2008/0046868 A1* | 2/2008 | Tsantilis ........................ 717/136 |
| 2008/0065455 A1 | 3/2008 | Sun et al. |
| 2008/0086485 A1 | 4/2008 | Paper |
| 2008/0120614 A1 | 5/2008 | Yamada |
| 2008/0127046 A1 | 5/2008 | Mitchell et al. |
| 2008/0140778 A1 | 6/2008 | Banavar et al. |
| 2008/0168529 A1 | 7/2008 | Anderson et al. |
| 2008/0228851 A1 | 9/2008 | Angelov et al. |
| 2008/0229278 A1 | 9/2008 | Liu et al. |
| 2008/0235710 A1 | 9/2008 | Challenger et al. |
| 2008/0243484 A1 | 10/2008 | Mohri et al. |
| 2009/0019380 A1 | 1/2009 | Tanaka et al. |
| 2009/0070165 A1 | 3/2009 | Baeuerle et al. |
| 2009/0100407 A1 | 4/2009 | Bouillet et al. |
| 2009/0125977 A1 | 5/2009 | Chander et al. |
| 2009/0150902 A1 | 6/2009 | Gisolfi |
| 2009/0171999 A1 | 7/2009 | McColl et al. |
| 2009/0177955 A1 | 7/2009 | Liu et al. |
| 2009/0177957 A1 | 7/2009 | Bouillet et al. |
| 2009/0249370 A1 | 10/2009 | liu et al. |
| 2009/0265718 A1 | 10/2009 | Liu et al. |
| 2010/0095269 A1* | 4/2010 | Bouillet et al. ................ 717/104 |
| 2010/0293043 A1 | 11/2010 | Atreya et al. |
| 2011/0078285 A1 | 3/2011 | Hawkins et al. |
| 2011/0107273 A1 | 5/2011 | Ranganathan et al. |
| 2013/0047150 A1 | 2/2013 | Malasky et al. |
| 2013/0185119 A1* | 7/2013 | Palao et al. ................... 705/7.36 |

OTHER PUBLICATIONS

Sirin et al., "HTN planning for Web Service composition using SHOP2," Elsevier, 2004, 20pg.*
Sohrabi et al., "Composition of Flow-Based Applications with HTN Planning," SPARK, 2012, 7pg.*
Wu et al., "Automating DAML-S Web Services Composition Using SHOP2," Springer-Verlag, 2003, 16pg.*
Altinel, M.: Damia: A data mashup fabric for intranet applications. In: VLDB. (2007).
Narayanan, S., McIlraith, S.: Simulation, verification and automated composition of web services. In: WWW. (2002).
Wolf et al, J.: SODA: an optimizing scheduler for large-scale stream-based distributed computer systems. In: Middleware. (2008) 306-325.
Riabov, A., Bouillet, E., Feblowitz, M., Liu Z., Ranganathan, A.: Wishful search: Interactive composition of data mashups. In: WWW. (2008).
Bouillet, E., Feblowitz, M. Liu, Z., Ranganathan, A., Riabov, A.: A tag-based approach for the design and composition of information processing applications. In: OOPSLA. (2008) 585-602.

(56) References Cited

OTHER PUBLICATIONS

Krishnan, S., Wagstrom, P., Laszewski, G.V.: GSFL: A workflow framework for grid services. Technical report, Argonne National Laboratory, 9700 S. Cass Avenue, Argonne, IL 60439 (2002).
Riabov, A., Liu, Z.: Scalable planning for distributed stream processing systems. In: Intl Conf on Automated Planning and Scheduling. (2006).
Gedik, B., Andrade, H., Wu, K.L., Yu, P.S., Doo, M.: SPADE: the System S declarative stream processing engine. In: SIGMOD 2008. (2008) 1123-1134.
A. Ranganathan, et al., "Mashup-Based Information Retrieval for Domain Experts", CIKM'09, pp. 711-720, Nov. 2-6, 2009.
B. Srivastava, et al., "Web Service Composition—Current Solutions and Open Problems", In ICAPS 200 Workshop on Planning for Web Services., pp. 28-35, 2003.
Shirin Sohrabi, "Customizing the Composition of Actions Programs, and Web Services With User Preferences" ISWC 2010, pp. 321-329, 2010.
N. Queiroz Lino, et al., "Emergencygrid—Planning in Convergence Environments", Proceedings of the Scheduling and Planning Applications Workshop, Jun. 26, 2012, pp. 56-61.
J. Baier, et al., "Planning With Preferences", AI Magazine, pp. 25-36, 2008.
J. Rao et al., "A Survey of Automated Web Service Composition Methods", SWSWPC 2004.
S. Sohrabi, et al."Composition of Flow-Based Applications With HTN Planning", International Conference on Automated Planning and Scheduling, pp. 1-7, Jun. 2012.
D. Nau, "SHOP2: An HTN Planning System", Journal of Artificial Intelligence Research 20, pp. 379-404, 2003.
E. Bouillet, et al., "MARIO: Middleware for Assembly and Deployment of Multi-Platform Flow-Based Applications", Middleware '09 Proceedings of the 10th ACM/IFIP/USENIX International Conference on Middleware, 2009.
M. Menezes, et al., Planning Task Validation, Proceedings of the Scheduling & Planning Applications Workshop, pp. 48-55, 2012.
C. Guzman, et al., "PELAEA: A Domain-Independent Architechture for Planning, Execution and Learning", Proceedings of the Scheduling and Planning Applications Workshop, pp. 38-45, 2012.
T. Serra, et al., "On Estimating the Return of Resource Acquisitions Through Scheduling: An Evaluation of Continuous-Time MILP Models to Approach the Development of Offshore Oil Wells", Proceedings of the Scheduling and Planning Applications Workshop, pp. 32-37, 2012.
S. Sohrabi, et al., "HTN Planning With Preferences", Proceedings of the 21st International Joint Conference on Artificial Intelligence (IJCAI) , pp. 1790-1797, 2009.
C. Chanel, et al., "Planning for Perception and Perceiving for Decision: POMDP-Like Online Target Detection and Recognition for Autonomous UAVs", Proceedings of the Scheduling and Planning Applications Workshop, pp. 24-31, 2012.
Carpanzano et al., "Constraint-Based Scheduling for Closed-Loop Production Control in RMSs", Proceedings of the Scheduling and Planning Applications Workshop, Jun. 26, 2012, pp. 17-23.
M. Lin, et al., Digital Cityscapes: Challenges and Opportunities for Planning and Scheduling, Proceedings of the Scheduling and Planning Applications Workshop, pp. 46-47, 2012.
J. Han, et al., "Data Mining: Concepts and Techniques", 2nd Edition, University of Illinois at Urbana-Champaign, pp. 227-283, 2006.
T. Vaquero, et al., "Planning and Scheduling Ship Operations on Petroleum Ports and Platforms", Proceedings of the Scheduling and Planning Applications Workshop, pp. 8-16, 2012.
Sheshagiri et al., "A Planner for Composing Services Described in DAML-S", ACM 2003, pp. 1-5.
Akkiraju et al., "SEMAPLAN: Combining Planning with Semantic Matching to Achieve Web Service Composition", American Association for Artificial Intelligence 2005, pp. 1-8.
Navendu Jain, Lisa Amini, Henrique Andrade, Richard King, Yoonho Park, Philippe Selo and Chitra Venkatramani, "Design, Implementation, and Evaluation of the Linear Road Benchmark on the Stream Processing Core", Proceedings of ACM SIGMOD 2006.
Zhen Liu, Anand Ranganathan and Anton Riabov, "A Planning Approach for Message-Oriented Semantic Web Service Composition", in AAAI-2007.
Marti Hearst, Design Recommendations for Hierarchical Faceted Search Interfaces, ACM SIGIR Workshop on Faceted Search, Aug. 2006.
Rana et al., An XML Based Component Model for Generating Scientific Applications and Performing Large Scale Simulations in a Meta-computing Environment, Google 2000, pp. 210-224.
Santos-Neto et al., Tracking Usage in Collaborative Tagging Communities, Google 2007, pp. 1-8.
Li et al. Collaborative Tagging Applications and Approaches, IEEE Sep. 2008, pp. 1-8 (14-21).
Connor et al, "Key-key value stores for efficiently processing graph data in the cloud", IEEE, pp. 88-93, 2011.
Ma et al., "Mining web graphs for recommendations", IEEE, pp. 1-14, 2011.
Jiang et al., "XML RL update language: syntax and semantics", IEEE, pp. 810-816, 2010.
Comito et al., "Selectively based XML query processing in structured peer to peer networks", ACM IDEAS, pp. 236-244, 2010.
Lyritsis et al., "TAGs; Scalable threshold based algorithms for proximity computation in graphs", ACM EDBT, pp. 295-306, 2011.
Riabov et al., "Wishful Search: Interactive Composition of Data Mashups", Google 2008, pp. 775-784.
Habernal et al., "Active Tags for Semantic Analysis", Google 2008, pp. 69-76.
A. Riabov and Z. Liu,; "Scalable Planning for Distributed Stream processing Systems", in ICAPS '06, 2006.
E. Sirin and B. Parsia, "Planning for Semantic Web Services", In Semantic Web Services Workshop at 3rd ISWC, 2004.
K. Whitehouse, F. Zhao and J. Liu, Semantic Streams: a Framework for Composable Semantic Interpretation of Sensor Data, in EWSN '06, 2006.
M. Pistore, P. Traverso, P. Bertoli and A. Marconi, Automated Synthesis of Composite BPEL4WS Web Services., in ICWS, 2005.
Baird, R.; Hepner, M.; Jorgenson, N.; Gamble, R., "Automating Preference and Change in Workflows," Seventh International Conference on Composition-Based Software Systems (Feb. 25-29, 2008), pp. 184-193 [retrieved http://ieeexplore.ieee.org/stamp/stamp.jsp?tp=&arnumber=4464023&isnumber=4463987].
Pistore, M.; Barbon, F.; Bertoli, P.; Shaparau, D.; Traverso, P., "Planning and Monitoring Web Service Composition" (2004), AIMSA 2004, LNAI 3192, pp. 106-115 [retrieved from http://www.springerlink.com/content/21nucbh4rrjfk8av/fulltext.pdf].
Peer, J., "Web Service Composition As AI Planning—A Survey", (2005) [retrieved from http://decsai.ugr.es/~farco/CDoctorado/bibliografia/refPlanning4SW/LiInkedDocuments/webservice-composition-as-aiplanning-pfwsc.pdf].
Hepner, M., "Dynamic Changes to Workflow Instances of Web Services," (2007), University of Tulsa, [retrieved from http:/www.seat.utulsa.edu/papers/Hepner07-Dissertation.pdf].
A. Stentz, The Focused D* Algorithm for Real-Time Replanning (IJCAI-1995).
Narayanan, S., and McIlRaith, S. 2002, Simulation, verification and automated composition of web services, in WWW'02.
Traverso, P., and Pistore, M. 2004, Automated composition of semantic web services into executable processes, in ISWC'04.
Heinlein, C. "Workflow and Process Synchronization with Interaction Expressions and Graphs", 2001, IEEE, p. 243-252.
Camilo Rostoker, Alan Wagner, Holger Hoos, "A Parallel Workflow for Real-time Correlation and Clustering of High-Frequency Stock Market Data", (Mar. 26-30, 2007), Parallel and Distributed Processing Symposium, 2007, IPDPS 2007. IEEE International pp. 1-10 [retrieved from http://ieeexplore.ieee.org/stamp/stamp.jsp?tp=arnumber=4227944&isnumber=4227918].

(56) References Cited

OTHER PUBLICATIONS

Xie et al., "An additive reliability model for the analysis of modular software failure data", Oct. 24, 1995, IEEE, p. 188-193.

Groen et al., "Reliability data collection and analysis system", Aug. 24, 2004, IEEE, p. 43-48.

Bohannon et al, "Optimizing view queries to ROLEX to support navigable results trees", ACM, pp. 1-12, 2002.

Altinel, et al., "Damia—A Data Mashup Fabric for Internet Applications", Sep. 28, 2007.

[Traverso and Pistore, 2004] P. Traverso and M. Pistore. Automated Composition of Semantic Web Services into Executable Processes. In Proc. ISWC'04, 2004.

Riabov, A., and Lui, Z. 2005. Planning for stream processing systems. In Proc. of AAAI-05.

Hinchcliffe, D.: A bumper crop of new mashup platforms (2007), Published at http://blogs.zdnet.com/Hinchcliffe/?p=111.

\* cited by examiner

| Cascade | | | HTN |
|---|---|---|---|
| Flow | → | | Plan |
| Cascade flow pattern | → | | HTN planning |
| Stream | → | | Variables |
| Tag | → | | Predicate |
| Tag hierarchy→ | | Axioms | |
| Primitive component | → | | Operator |
| Composite component | → | | Method |
| Choice invocation | → | | Task with multiple methods |
| Optional invocation | → | | Task with multiple methods |
| Abstract component | → | | Task |
| Main Composite | → | | Initial task network |
| Cascade goal | → | | PDDL simple preferences |
| Satisfying flow | → | | Optimal plan |

AUTOMATED SOFTWARE COMPOSITION

GOVERNMENT INTERESTS

This invention was made with U.S. Government support under Contract No.: H98230-11-C-0276 awarded by the Department of Defense. The U.S. Government has certain rights in this invention.

RELATED APPLICATIONS

The application is related to U.S. patent application Ser. No. 11/872,385, filed Oct. 15, 2007, U.S. patent application Ser. No. 12/608,689, filed Oct. 29, 2009 and U.S. patent application Ser. No. 12/626,745, filed Nov. 27, 2009, the disclosures of which are incorporated by reference herein in their entireties.

BACKGROUND

1. Technical Field

The present invention relates to the composition of software applications, and more particularly, to automated composition of flow-based applications.

2. Discussion of the Related Art

Automated planning can be used to create composite applications in compositional architectures such as web services and stream processing. The applications may be processing graphs composed of smaller modular components such as service invocations, data processing operators, or other (smaller) processing graphs.

BRIEF SUMMARY

According to an exemplary embodiment of the present invention, a method for automated composition of an application includes: receiving a customizable template for application composition and a composition goal, wherein the goal comprises a plurality of tags and the goal is incomplete such that more than one possible composition matches the goal; refining the goal by automatically adding refinement tags to the goal; and generating an application flow that matches the customizable template and the refined goal, wherein the application flow comprises data sources, data processing operators, and outputs of the application flow.

DETAILED DESCRIPTION

An information processing flow obtains data from different sources, aggregates or integrates them in different manners, applies different kinds of analyses on the data and, visualizes or handles the end-results in different ways, for example. An information processing flow may be viewed as a directed acyclic graph of black-box components, which include data sources and processing components, connected by data flow links. Flows are used to describe information processing applications in different platforms including service oriented systems, event-driven systems, data mashups, stream processing systems, extract-transform-load systems and the grid, for example.

Challenges exist in the assembly and deployment of information processing flows. For example, assembly is complex since there may be a very large number of components available, and users may not be aware of the syntactic and semantic constraints in assembling different components into complex flows. Deployment is complex since the users may not know how best to distribute and schedule the flow graph on a distributed system.

In this disclosure, described are exemplary embodiments for automated software composition with situational goal refinement.

According to an exemplary embodiment of the present invention, a customizable template may be implemented to direct and aid automated software composition. The customizable template may dictate the ways in which different components of software can be composed, and may have sufficient flexibility so that the template is reusable by different users.

There are a variety of different ways a composition template can be specified. One way to represent the composition template is based on Hierarchical Task Networks (HTNs).

HTN planning is a popular and widely used planning paradigm, and many domain-independent HTN planners exist. In HTN planning, the planner is provided with a set of tasks, constraints on these tasks, and a set of methods that control decomposition of these tasks. A plan may be formulated by repeatedly decomposing tasks into smaller and smaller subtasks until primitive, executable tasks are reached.

Another way to specify a composition template is to specify patterns, for example, using the Cascade language. This technique is used in MARIO (Mashup Automation with Runtime Invocation and Orchestration), a tool for assisted composition of flow-based applications, to allow domain experts to explore the space of possible flows and help them construct, parameterize, and deploy compositions/mashups of data or code. A description of this can be found in Eric Bouillet, Mark Feblowitz, Hanhua Feng, Zhen Liu, Anand Ranganathan and Anton Riabov. "A Tag-Based Approach for the Design and Composition of Information Processing Applications," OOPSLA, 2008, Oct. 19-23, 2008, Nashville, Tenn., the disclosure of which is incorporated by reference herein in its entirety.

It is often the case in practice that users of automated composition software are unable to provide an unambiguous (e.g., complete) processing goal to such a system, since by design they do not have to be aware of all the data sources and software components available for automated composition. As a result, methods to automatically refine incomplete goals are desirable.

According to an exemplary embodiment of the present invention, a method for automated software composition includes situational goal refinement.

A system may use tag clouds to guide a user in the assembly and configuration of new compositional applications automatically based on user-selected output properties.

Feedback may be provided by showing a preview of the resulting output, and updates may be made to the tag cloud based on selected tags. According to an exemplary embodiment of the present invention, a tag cloud is a weighted list of tags. Weights reflect the popularity of tags. Clicking on any tag in the tag cloud adds the tag to a planning goal, and to the list of selected tags. This also leads to a new processing graph being composed, and a new tag cloud. The new tag cloud is created in the context of currently selected tags. In particular, the new tag cloud does not include the selected tags or any other tags that never appear on the same feed description where all selected tags appear. When the new processing graph is constructed, it is deployed and an output feed is shown in a preview window.

Implied tags are tags that always appear together with the selected tags. Guessed tags are tags assigned to the output of the graph, and as such they do not appear in implied or selected tags.

Users interact with the system by specifying processing goals as a set of tags via a user interface. The system responds by generating a processing graph that outputs information that satisfies this goal. The system also updates the user interface elements.

In some cases, the processing goals may be incomplete.

According to an exemplary embodiment of the present invention, incomplete goals may be completed automatically. Automatic completion of incomplete goals may allow additional semantics-based decisions to take place, before an optimization method finds the best plans or flows for the specified goal.

According to an exemplary embodiment of the present invention, tag semantics can be leveraged and cross-correlated with other available information during goal refinement. This information may include semantic information describing context, project, phase in the project lifecycle, team mission, knowledge of temporal patterns, and other business-level and semantic considerations relevant to conditions under which goals are submitted. How this additional information is received is not limited. It may be given by experts, other systems, or inferred automatically from historical data.

Figure 1:
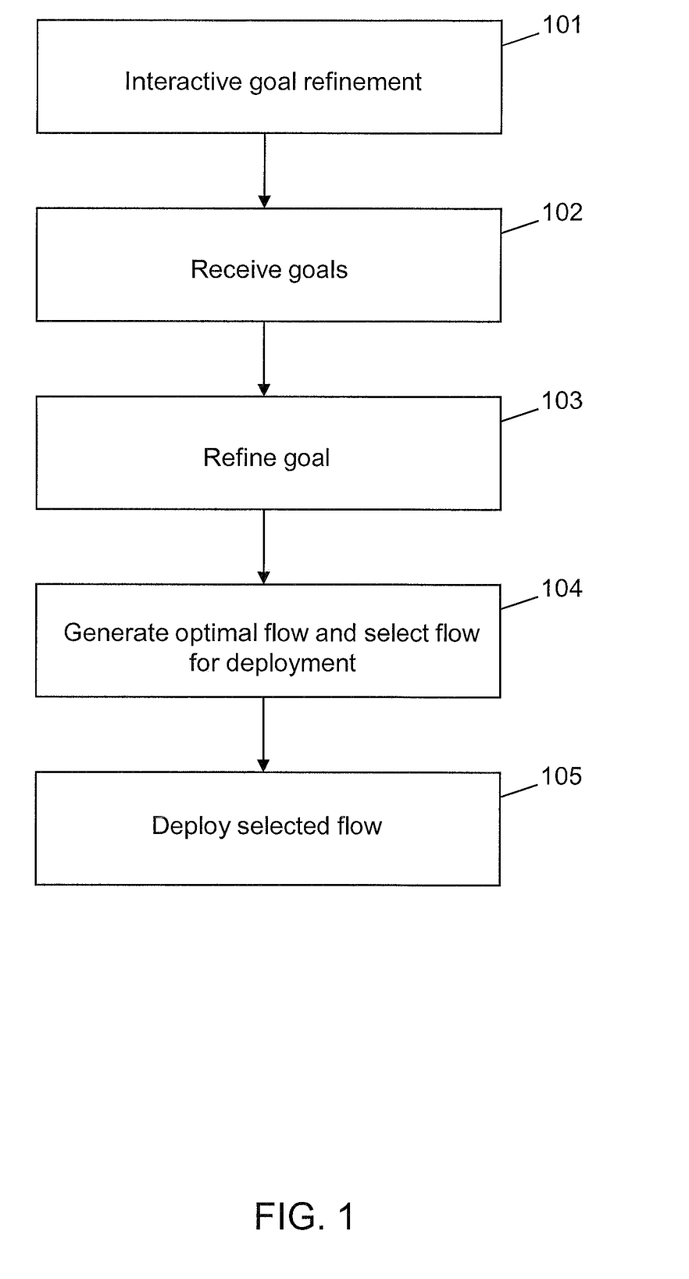
FIG. 1 is a flow diagram for a method of software composition with goal refinement according to an exemplary embodiment of the present invention.

Referring to FIG. 1, interactive goal refinement 101 may be performed according to user preferences and selections. User refined goals are taken as input at block 102. In other words, a customizable template for application composition and a composition goal are received. The composition goal may include a plurality of tags and be incomplete such that more than one possible composition matches the goal. Automatic goal refinement is performed at block 103. For example, refinement tags are added to the goal. An optimal flow is generated based on the goals and a user may select a flow for deployment at block 104. The generated flow may be an application flow that matches the customizable template and the refined goal. The application flow may include components such as data sources, data processing operators, outputs of the application flow, etc. The selected flow may then be deployed 105.

Figure 2:
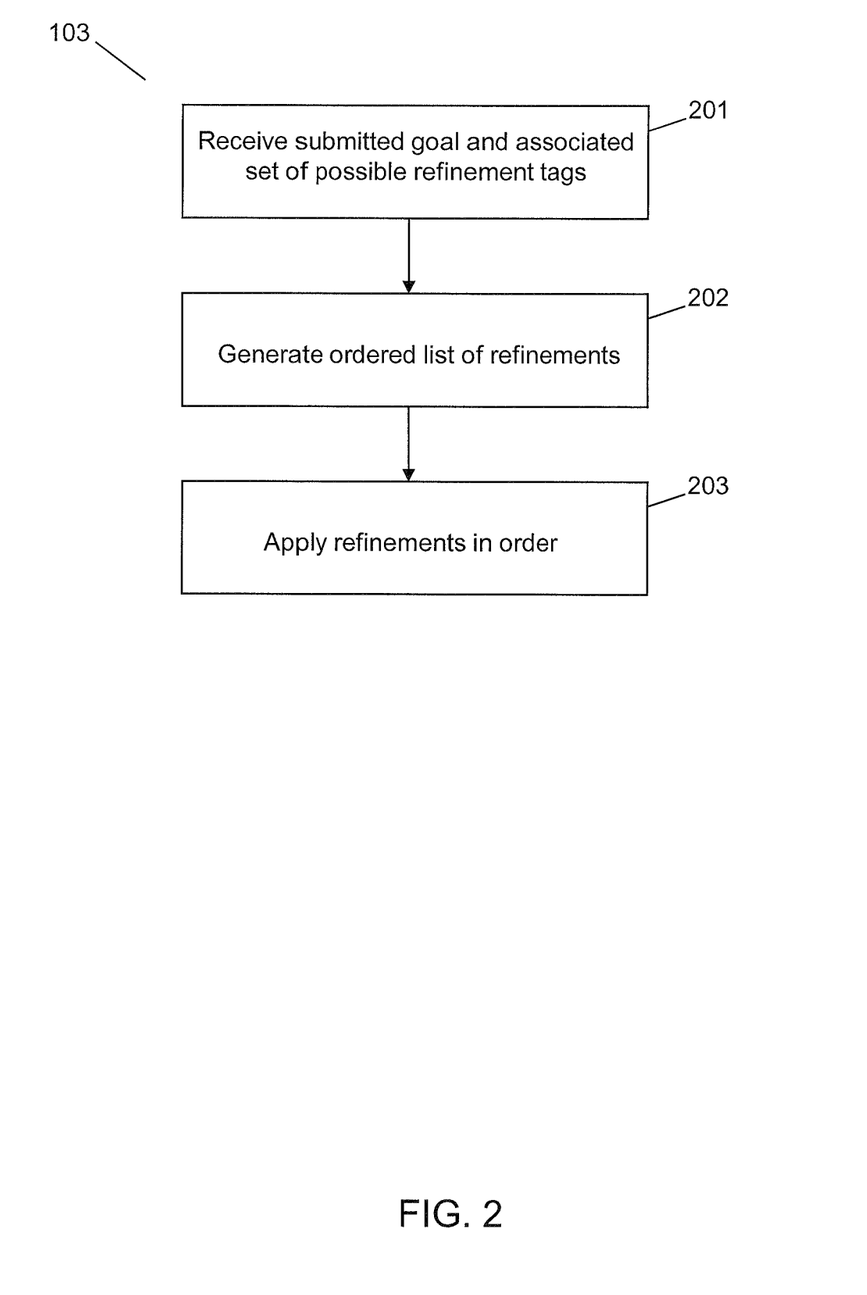
FIG. 2 is a flow diagram for a method of generating a list of refinements according to an exemplary embodiment of the present invention.

An exemplary method for automatic goal refinement 103 is depicted in FIG. 2.

Referring to FIG. 2, the interactively refined goals may be received with an associated set of possible refinement tags 201. An ordered list of refinements may be generated 202 from available information about any the following relevant context. For example: a project that the user submitting the goal is working on; a mission of the team that the user belongs to; current objectives of the team and of the user; time-dependent context, derived from knowledge of temporal patterns (potentially specific to user, team, or project, or general patterns) and time of goal submission; and other information derived from available sources. Refinements, determined automatically, may be applied in order 203. For example, in order of their rank. The application of refinements 203 is depicted in FIG. 3.

Figure 3:
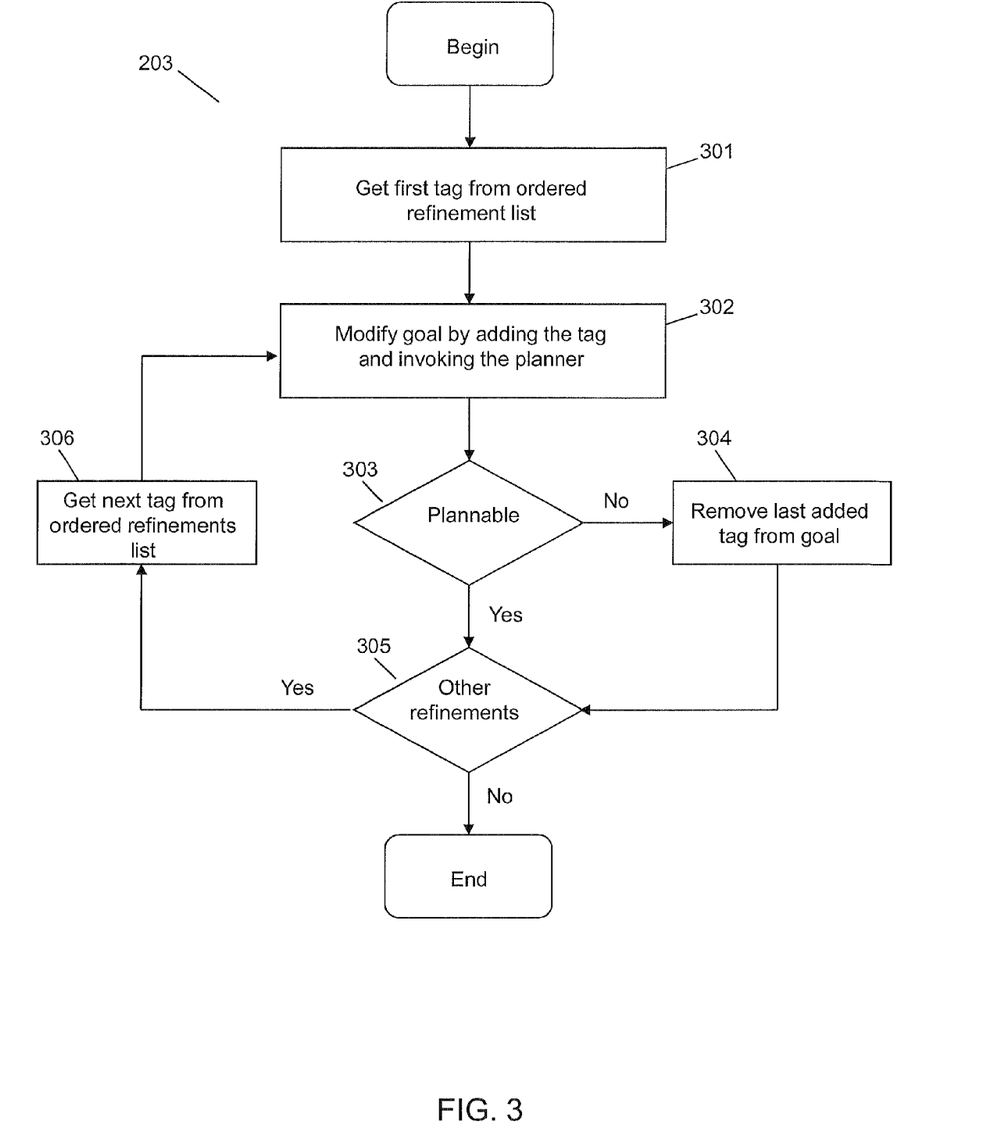
FIG. 3 is a flow diagram for a method of applying refinements according to an exemplary embodiment of the present invention.

Referring to FIG. 3, given a first tag from an order refinement list 301, a goal may be modified by adding a tag and invoking the planner 302. If the tag is plannable 303, additional refinements may be considered at block 305. For a tag that is not plannable 303, the tag is removed from the goal at block 304. The method continues through the ordered refinements list 306 until all refinements have been considered.

One useful way of refining incomplete goals is through user preferences, for example, users may prefer a certain type of machine learning algorithm over another, or data from one source that is more trusted than another similar source.

Goal specification is an iterative process. The user specifies a goal as a set of tags for example, specifying an average stock price. The system, after analyzing available data sources and analytics, notifies the user that refinements are possible. For example, exponential average or window average, live data or historical data, etc. The user can refine the goal, creating a new goal, such as, average stock price for live data. The system may respond that exponential average or window average refinement is possible. Note that not all refinements of the previous step will be available. The user is not required to refine the goal until no additional refinements are possible. The system may then auto-complete the ambiguous goal, in a way that does not contradict end user's preferences.

According to an exemplary embodiment of the present invention, user preferences may be inferred. The preferences may be inferred from records of a user's previous goals. By inferring user preferences over time, obsolete records may be discarded in view of changes to usage patterns. Association rule based mining may be used on historically submitted goals to infer the associations. Consider the following examples:

Historical Data selected=>Exponential Average also selected w.p. 0.65.

Live Data selected=>Window Average w.p. 0.82.

In this way, inferred associations may be represented as preferences for an HTN problem. An HTN planner may support preferences to find a plan that satisfies the goal and preferences. Such as described in Sohrabi, S.; Baier, J. A.; and McIlraith, S. A., 2009, HTN planning with preferences. In Proceedings of the 21$^{st}$ International Joint Conference on Artificial Intelligence (IJCAI), pp. 1790-1797 (Sohrabi et al. 2009), the disclosure of which is incorporated by reference herein in its entirety.

As previously mentioned, one useful way to automatically refine incomplete goals is through inferred user preferences. To achieve this, we may express software composition domains for information processing flows such as those described above into a paradigm that supports planning with user preferences such as HTNs. Such preferences may be inferred as described above.

As description of HTN planning and Cascade follows. This will serve as the basis for a further exemplary embodiment of the present invention in which the customizable template and the refined goal of FIG. 1 are translated into HTN, solved with an HTN planner, and then, translated back into the originally determined application flow.

HTN planning is a widely used planning paradigm and many domain-independent HTN planners exist. The HTN planner is given the HTN planning problem: the initial state $s_0$, the initial task network $w_0$, and the planning domain D (a set of operators and methods). HTN planning is performed by repeatedly decomposing tasks, by the application of methods, into smaller and smaller subtasks until a primitive decomposition of the initial task network is found. More formally, $\pi=o_1 o_2 \ldots o_k$ is a plan for HTN planning problem $P=(s_0, w_0, D)$ if there is a primitive decomposition, w, of $w_0$ of which $\pi$ is an instance. A task network is a pair (U, C) where U is a set of tasks and C is a set of constraints. A task is primitive if its name matches with an operator, otherwise it is non-primitive. An operator is a regular planning action, described by its name, precondition and effects. It can be applied to accomplish a primitive task. A method is described by its name, the task it can be applied to task(m), and its task network subtask (m). A method m can accomplish a task t if there is a substitution σ such that σ(t)=task(m). Several methods can accomplish a particular non-primitive task, leading to different decompositions thereof.

HTNPLAN-P is a preference based HTN planner, built on top of a Lisp implementation of SHOP2. SHOP2 is described in Nau, D. S.; Au, T.-C; Ilghami, O.; Kuter, U.; Murdock, J. W.; Wu, D.; and Yaman F. 2003. SHOP2: An HTN planning system. Journal of Artificial Intelligence Research 20:379-404, the disclosure of which is incorporated by reference herein in its entirety. An example of HTNPLAN-P is described in Sohrabi et al. 2009. HTNPLAN-P takes as input an HTN planning problem, specified in the SHOP2's specification language (not in planning domain definition language (PDDL)). HTNPLAN-P performs incremental search and uses a variety of different heuristics including the Lookahead Heuristic (LA). HTNPLAN-P is modified to implement a heuristic according to an exemplary embodiment of the present invention, hereinafter referred to as the Enhanced Lookahead Heuristic (ELA). HTNPLAN-P is also used to evaluate this approach.

Cascade, e.g., flow patterns for stream processing, will now be discussed. The Cascade language describes data flow patterns that can guide automated software composition. Cascade is an alternative to the lower-level planning domain languages like PDDL that are difficult to use as part of a software development cycle. Cascade has a programming language syntax that is friendly to software developers, includes integrated development tools, and can be used with different execution environments. An example of such a programming language is described in E. Bouillet, M. Feblowitz, H. Feng, A. Ranganathan, A. Riabov, O. Udrea and Z. Liu. "MARIO: middleware for assembly and deployment of multi-platform flow-based applications," Proceedings of the 10th ACM/IFIP/USENIX International Conference on Middleware, No. 26, Springer-Verlag New York Inc., 2009, the disclosure of which is incorporated by reference herein in its entirety.

An example of an execution environment is stream processing middleware (for example, IBM InfoSphere Streams), which facilitates the development of distributed applications that must process high volumes of data in memory. Stream processing applications are constructed as data flow graphs composed of modular software components that communicate via data streams, and described in a programming language, e.g., Stream Processing Language (SPL). The middleware deploys the components of the application across multiple hardware nodes within a dedicated stream processing cluster, manages them and provides efficient data transport. Cascade flow patterns define the space of valid composed flows, which are then mapped to stream processing data flow graphs in SPL.

Figure 4:
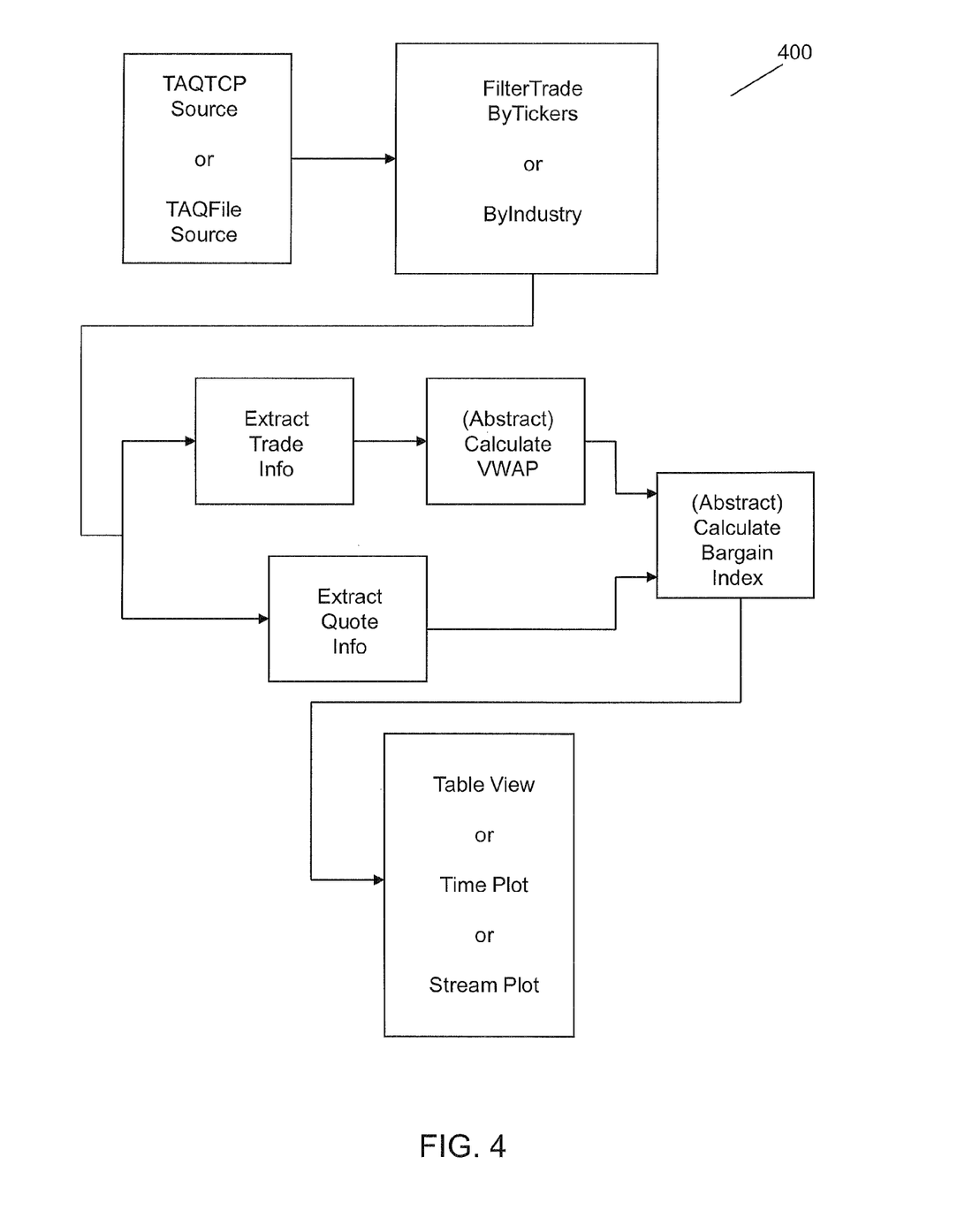
FIG. 4 is an example of a Cascade flow pattern.

FIG. 4 graphically represents a Cascade flow pattern 400 for a stream processing application from a financial domain. The text representation of this pattern is omitted, since it is not essential for understanding this example. This application helps financial experts decide whether a current price of a stock is a bargain. The main composite is called StockBargainIndexComputation. In other words, all blocks in FIG. 4 are part of StockBargainIndexComputation. The blocks 'extract trade info,' '(abstract) calculate bargain index,' 'extract quote info' and '(abstract) calculate VWAP' are part of BIComputationCore. The Cascade flow pattern 400 describes how the data is obtained from sources, processed by components, and visualized in different ways. Source data, Trade and Quote (TAQ), can come either live, or replayed from a file. This data can be filtered according to a set of tickers or according to a specified industry, or neither as the filter components are optional (indicated by the "?"). The Volume-Weighted Average Price (VWAP) and the Bargain Index (BI) calculations can be performed by a variety of concrete components (which inherit from abstract components CalculateVWAP and CalculateBargainIndex respectively). The final results can be visualized using a table, a time-plot or a stream-plot. Note, the composite includes a sub-composite BIComputation.

A single flow pattern defines a number of actual flows. In other words, a Cascade flow pattern describes a set of flows by specifying different possible structures of flow graphs, and possible components that can be part of the graph. As an example, assume there are five different descendants for each of the abstract components. Then the number of possible flows defined by StockBargainIndexComputation is $2 \times 3 \times 5 \times 5 \times 3$, or 450 flows.

A flow pattern in Cascade is a tuple $F=(\xi,(V,E),M)$, where ξ is a directed acyclic graph, and M is a main composite. Each vertex, $v \in V$, can be the invocation of one or more of the following: (1) a primitive component, (2) a composite component, (3) a choice of components, (4) an abstract component with descendants, (5) a component, optionally. Each directed edge, $e \in E$ in the graph represents the transfer of data from an output port on one component to the input port of another component. Throughout this disclosure, edges are referred to as streams, outgoing edges are referred to as output streams, and ingoing edges are referred to as input streams. The main composite, M, defines the set of allowable flows. For example, if StockBargainIndexComputation is the main composite in FIG. 4, then any of the 450 flows that it defines can potentially be deployed on the underlying platform.

Components in Cascade can have zero or more input ports and one or more output ports. A component can be either primitive or composite. A primitive component is an atomic element of the pattern graph, and is usually associated with a code fragment, which is used in code generation during flow graph deployment. A composite component internally defines a flow of other components. In FIG. 4, the TableView and BIComputationCore are examples of primitive and composite components respectively. Similarly, an abstract component includes the declaration of inputs and outputs, but without a code fragment or graph. Instead, separately defined concrete components can be declared to implement an abstract component. Note, a concrete component can be primitive or composite. Including an abstract component within a graph pattern (e.g., a composite) defined as a point of variability of the graph, allowing any implementation of the abstract to be used in place of the abstract.

Cascade includes two more constructs for describing graph variability. The choice invocation can be used to enumerate several alternatives to be used within the same location in the graph. For example, the pattern in FIG. 4 defines a choice between TCP source and file source. The alternatives must have the same number of inputs and the same number of outputs. Any component contained within the optional invocation becomes optional. This requires the contained component to have the same number of inputs and outputs. For example, in FIG. 4 the choice between filtering trades "ByTickers" and "ByIndustry" is made optional, allowing graphs that include no filters at all to be valid instantiations of this pattern.

In Cascade, output ports of components can be annotated with user-defined tags to describe the properties of the produced data. Tags can be any keywords related to terms of the business domain. Tags are used by the end-user to specify the composition goals; referred to as Cascade goals. For each graph composed according to the pattern, tags associated with output streams are propagated downstream, recursively associating the union of all input tags with outputs for each component. Cascade goals specified by end users are then matched to the description of the graph output. Graphs that include all goal tags become candidate flows (or satisfying flows) for the goal. For example, if we annotate the output port of the FilterTradeByIndustry component with the tag ByIndustry, there would be 2×5×5×3=150 satisfying flows for the Cascade goal ByIndustry. Planning is used to find "best" satisfying flows efficiently from the millions of possible flows, present in a typical domain.

From Cascade patterns to HTN planning. In this section, according to an exemplary embodiment of the present invention, we describe an approach to create an HTN planning problem with preferences from any Cascade flow pattern with a set of Cascade goals. Additional details on this approach can be found in Composition of Flow-Based Applications with HTN Planning by Shirin Sohrabi, Octavian Udrea, Anand Ranganathan and Anton Riabov, 22$^{nd}$ International Conference on Automated Planning and Scheduling, Jun. 26, 2012, Atibaia, Sao Paulo, Brazil, pp. 1-7, the disclosure of which is incorporated by reference herein in its entirety.

Figure 5:
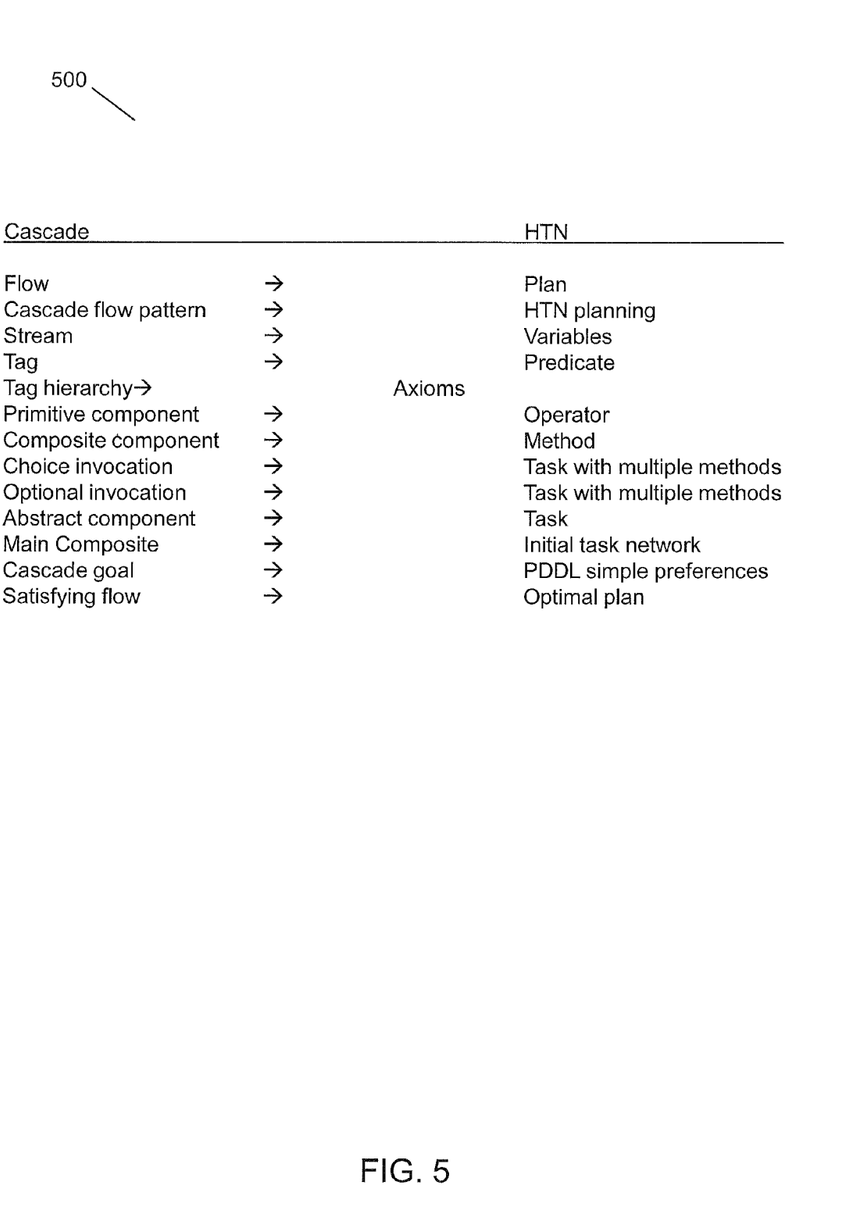
FIG. 5 illustrates encoding from Cascade to a Hierarchical Task Network (HTN)

In particular, we show how to: (1) create an HTN planning domain (specified in SHOP2, the base planner for HTNPLAN-P) from the definition of Cascade components, and (2) represent the Cascade goals as preferences. FIG. 5 shows at a high-level how the main elements in Cascade are encoded as HTN planning elements (500). For example, a primitive component is encoded as an operator and a composite component is encoded as an HTN method. Next, the steps of this transformation are described while using the example shown in FIG. 4 as a running example.

To do this, we employ SHOP2's specification language written in Lisp when describing the planning elements or when giving examples. We consider ordered and unordered task networks specified by keywords ":ordered" and ":unordered", distinguish operators by the symbol "!" before their names, and variables by the symbol "?" before their names.

Creating the HTN planning domain. In this section, according to an exemplary embodiment of the present invention, we describe an approach to translate the different elements and unique features of Cascade flow patterns to operators or methods, in an HTN planning domain.

Creating new streams. One of the features of the composition of the stream processing applications is that components produce one or more new data streams from several existing ones. Further the precondition of each input port is only evaluated based on the properties of connected streams; hence, instead of a single global state, the state of the world is partitioned into several mutually independent ones. Although it is possible to encode parts of these features in PDDL, experimental results have shown poor performance. In Riabov, A., and Liu, Z. 2005. Planning for stream processing systems. In Proceedings of the 20$^{th}$ National Conference on Artificial Intelligence (AAAI), 1205-1210 and Riabov, A., and Liu, Z. 2006. Scalable planning for distributed stream processing systems. In Proceedings of the 16$^{th}$ International Conference on Automated Planning and Scheduling (ICAPS), 31-42, they conjectured that the main difficulty in the PDDL representation is the ability to address creating new objects that have not been previously initialized to represent the generation of new streams. In PDDL, this can result in a symmetry in the choice for the object that represents the new uninitialized stream, significantly slowing down the planner.

To address the creation of new uninitialized streams an exemplary embodiment of the invention uses the assignment expression, available in the SHOP2 input language, in the precondition of the operator that creates the new stream. Next, we will discuss how to model Cascade components as operators and methods. Numbers are used to represent the stream variables using a special predicate called sNum. This number is then increased by manipulating the add and delete effects of the operators that are creating new streams. This sNum predicate acts as a counter to keep track of the current value that can be assigned for the new output streams.

The assignment expression takes the form "(assign v t)" where v is a variable, and t is a term. Here is an example of how to implement this approach for the "bargainIndex" stream, the outgoing edge of the abstract component CalculateBargainIndex in FIG. 4. The following precondition, add and delete list belong to the corresponding operators of this abstract component.

| Pre: | ((sNum ?current) |
| --- | --- |
| | (assign ?bargainIndex ?current) |
| | (assign ?newNum (call + 1 ?current))) |
| Delete List: | ((sNum ?current) |
| Add List: | ((sNum ?newNum)) |

Now for an invocation of the abstract component CalculateBargainIndex, new numbers, hence, new streams are used to represent the "bargainIndex" stream.

Tagging model for components. In Cascade, output ports of components are annotated with tags to describe the properties of the produced data. Some tags are called sticky tags, meaning that these properties propagate to all downstream components unless they are negated or removed explicitly. The set of tags on each stream depends on all components that appear before them or on all upstream output ports.

To represent the association of a tag to a stream, an exemplary embodiment of the invention uses a predicate "(Tag Stream)", where Tag is a variable representing a stream. Note that Tag should be grounded before any evaluation of state with respect to this predicate. To address propagation of tags, a forall expression is used, ensuring that all tags that appear in the input streams propagate to the output streams unless they are negated by the component.

A forall expression in SHOP2 is of the form "(forall X Y Z)", where X is a list of variables in Y, Y is a logical expression, Z is a list of logical atoms. Here is an example going back to FIG. 4. ?tradeQuote and ?filteredTradeQuote are the input and output stream variables respectively for the FilterTradeQuoteByIndustry component. Note, all tags are known ahead of time and they are represented by the predicate "(tag ?tag)". In addition, a special predicate different is used to ensure the negated tag AllCompanies does not propagate downstream.

```
(forall (?tag) (and (tags ?tag) (?tag ?QuoteInfo)
        (different ?tag AllCompanies))
    ((?tag ?filteredTradeQuote)))
```

Tag hierarchy. Tags used in Cascade belong to tag hierarchies (or tag taxonomies). This notion is useful in inferring additional tags. In the example in FIG. 4, it is known that the TableView tag is a sub-tag of the tag Visualizable, meaning that any stream annotated with the tag TableView is also implicitly annotated by the Visualizable. To address the tag hierarchy SHOP2 axioms are used. SHOP2 axioms are generalized versions of Horn clauses, written in this form:—head tail. The tail can be anything that appears in the precondition of an operator or a method. The following are axioms that express hierarchy of views.

```
:-    (Visualizable ?stream) ((TableView ?stream)
:-    (Visualizable ?stream) ((StreamPlot ?stream))
```

Component definition in the flow pattern. Next, the different pieces described so far are put together to create the HTN planning domain. In particular, the abstract components are represented by non-primitive tasks, enabling the use of methods to represent concrete components. For each concrete component, new methods that can decompose this non-primitive task (e.g., the abstract component) are created. If no method is written for handling a task, this is an indication that there are no concrete components written for this abstract component.

Components can inherit from other components. The net (or expanded) description of an inherited component includes not only the tags that annotate its output ports, but also the tags defined by its parent. This inheritance model is represented directly on each method that represents the inherited component using helper operators that add to the output stream, the tags that belong to the parent component.

Each primitive component is encoded as an HTN operator. The parameters of the HTN operator correspond to the input and output stream variables of the primitive component. The preconditions of the operator include the "assign expressions" as mentioned earlier to create new output streams. The add list also includes the tags of the output streams if any. The following is an HTN operator that corresponds to the TableView primitive component.

```
Operator:     (!TableView ?bargainIndex ?output)
Pre:    ((sNum ?current) (assign ?output ?current)
Delete List:  ((sNum ?current))
Add List:     ((sNum ?newNum) (TableView ?bargainIndex)
              (forall (?tag) (and (tags ?tag)
              (?tag ?bargainIndex)) ((?tag ?output))
```

Each composite component is encoded as HTN method with task networks that are either ordered or unordered. Each composite component specifies a graph clause within its body. The corresponding method addresses the graph clause using task networks that comply with the ordering of the components. For example, the graph clause with the BIComputationCore composite component in FIG. 4 can be encoded as the following task. Note, the parameters are omitted. Note also, ordered task networks are used for representing the sequence of components, and an unordered task network for representing the split in the data flow.

```
(:ordered (:unordered (!ExtractQuoteInfo)
         (:ordered (!ExtractTradeInfo) (CalcualteVWAP)))
         (CalculateBargainIndex))
```

Structural variations of flows. There are three types of structural variation in Cascade: enumeration, optional invocations, and the use of high-level components. Structural variations create patterns that capture multiple flows. Enumerations (choices) are specified by listing the different possible components. To capture the choice invocation, an exemplary embodiment of the invention uses multiple methods applicable to the same task. For example, to address choices of source, two methods are used, one for TAQTCP and one for TAQFile. A component can be specified as optional, meaning that it may or may not appear as part of the flow. Optional invocations are captured using methods that simulate the "no-op" task. Abstract components are used in flow patterns to capture high-level components. In HTN, this is already captured by method for each concrete component. For example, the task network of BIComputationCore includes the non-primitive task CalculateBargainIndex and different methods written for this task handle the concrete components.

Specifying Cascade goals as preferences. While Cascade flow patterns specify a set of flows, users can be interested in only a subset of these. Thus, users are able to specify the Cascade goals by providing a set of tags that they would like to appear in the final stream. In an exemplary embodiment of the present invention, the user-specified Cascade goals are specified as PDDL3 preferences. Currently, the use of simple preferences are exploited. Recall that simple preferences, or final-state preferences are a temporal formulae that express a preference for certain conditions to hold in the final state of the plan. For example, preferring that a particular tag appears in the final stream is a simple preference.

An advantage of encoding the Cascade goals as preferences is that the users can specify them outside the domain description as an additional input to the problem. In addition, by encoding the Cascade goals as preferences, if the goals are not achievable, a solution can still be found but with an associated quality measure. In addition, the preference-based planner, HTNPLAN-P, can potentially guide the planner towards achieving these preferences and can do branch and bound with sound pruning using admissible heuristics, whenever possible to guide the search toward a high-quality plan.

The following are example preferences that encode Cascade goals ByIndustry, TableView and LinearIndex. These PDDL3 simple preferences are over the predicate "(Tag-Stream)". Note that we may define a metric function for the generated preferences. In PDDL3 the quality of the plan is defined using a metric function. The PDDL3 function is-violated is used to assign appropriate weights to different preference formula. Note, inconsistent preferences are automatically handled by the metric function. If the Cascade goals, now encoded as preferences are mutually inconsistent, a higher weight can be assigned to the "preferred" goal. Otherwise, uniform weights can be used when defining a metric function.

```
(preference g1 (at end (ByIndustry ?finalStream)))
(preference g2 (at end (TableView ?finalStream)))
(preference g3 (at end (LinearIndex ?finalStream)))
```

Flow-based HTN planning problem with preferences. In this section, a flow-based HTN planning problem is characterized with preferences and the relationship between satisfying flows and optimal plans is discussed.

A Cascade flow pattern problem is a 2-tuple $P^F=(F, G)$, where $F=(\xi(V,E),M)$ is a Cascade flow pattern (where $\xi$ is a directed acyclic graph, and M is the main composite), and G is a set of Cascade goals. $\alpha$ is a satisfying flow for $P^F$ if and only if $\alpha$ is a flow that meets the main composite M. A set of Cascade goals, G, is realizable if and only if there exists at least one satisfying flow for it.

Given the Cascade flow pattern problem $P^F$, the corresponding flow-based HTN planning problem is defined with preferences as a 4-tuple $P=(s_o, w_o, D, \preceq)$, where: $s_o$ is the initial state consisting of a list of all tags and our special predicates; $w_o$ is the initial task network encoding of the main component M; D is the HTN planning domain, consisting of a set of operators and methods derived from the Cascade components $v \in V$; and $\preceq$ is a preorder between plans dictated by the set of Cascade goals G.

Computation. In the previous section, a method in accordance with an exemplary embodiment of the invention that translates Cascade flow patterns and Cascade goals into an HTN planning problem with preferences was described. The relationship between optimal plans and satisfying flows was also shown. Now, with a specification of preference-based HTN planning in hand, HTNPLAN-P is selected to compute these optimal plans that later get translated to satisfying flows for the original Cascade flow patterns. In this section, ELA according to an exemplary embodiment is focused on, and a description about how the required indexes for this heuristic can be generated in the preprocessing step is provided. ELA helps improve the HTN planning performance, especially in the harder problem sets; a problem can be harder if the goal tags appear in the harder to reach branches of search space. In addition, ELA can improve the HTN performance making it comparable with an SPPL planner on Cascade problems. On the other hand, the notion behind ELA and how we generate the required indexes is general enough to be used within other HTN planners as long as the set of tags (specific pre-defined predicates) are known in advance.

ELA, e.g., the enhanced lookahead function, estimates the metric value achievable from a search node N. To estimate this metric value, a set of reachable tags is computed for each task within the initial task network. A set of tags are reachable by a task if they are reachable by any plan that extends from decomposing this task. Note, it is assumed that every non-primitive task can eventually have a primitive decomposition.

The ELA function is an underestimate of the actual metric value because deleted tags, preconditions that may prevent achieving a certain tag, and the set of all reachable tags, which in many cases is an overestimate, are ignored. Nevertheless, this does not necessarily mean that the ELA function is a lower bound on the metric value of any plan extending node N. However, if it is a lower bound, then it will provide sound pruning if used within the HTNPLAN-P search algorithm and provably optimal plans can get generated. A pruning strategy is sound if no state is incorrectly pruned from the search space. That is whenever a node is pruned from the search space, that the metric value of any plan extending this node will exceed the current bound best metric can be proven. To ensure that ELA is monotone, for each node the intersection of the reachable tags computed for this node's task and the set of reachable tags for its immediate predecessor are taken.

Proposition. The ELA function provides sound pruning if the preferences are all PDDL3 simple preferences over a set of predefined tags and the metric function is non-decreasing in the number of violated preferences and in the plan length.

Proof: The ELA function is calculated by looking at a reachable set of tags for each task. Hence, it will regard as violated preferences that have tags that do not appear in the set of reachable tags. This means that these tags are not reachable from node N. Given that we ensure the ELA function does not decrease and all of the preferences are PDDL3 simple preferences over a set of predefined tags, the is-violated function for the hypothetical node $N_E$, that ELA is evaluating the metric for, is less than or equal to any node N' reachable from node N (for each preference formula). Moreover, since it is assumed that the metric function is non-decreasing in the number of violated preferences and in plan length, the metric function of the hypothetical node $N_E$ will be less than or equal to the metric function of every successor node N' reachable from node N. This shows that the ELA evaluated at node N returns a lower bound on the metric value of any plan extending N. Thus, the ELA function provides sound pruning.

Generation of the heuristic indexes. In this section, we briefly discuss how to generate the reachable tags from the corresponding HTN planning problem. The set of reachable tags can also be generated from the description of the Cascade flow patterns.

Algorithm 1 shows pseudocode of our offline procedure, according to an exemplary embodiment of the present invention that creates a set of reachable tags for each task. It takes as input the planning domain D, a set of tasks (or a single task) w, and a set of tags to carry over C. The algorithm should be called initially with the initial task network $w_0$, and $C=\theta$. The reason for why the sets of tags to carry over is tracked is because we want to make sure we calculate not only a set of tags produced by a decomposition of a task network (or a task), but also we want to find a set of reachable tags for all possible plan extensions from this point on.

The call to GetRTags will produce a set of tags reachable by the set of tags w (produced by w and C). To track the produced tags for each task a map R is used. If w is a task network then we consider three cases: (1) task network is empty, then return C, (2) w is an ordered task network, then for each task $t_i$ call the algorithm starting with the rightmost task $t_n$ updating the carry C, (3) w is unordered, then call GetRTags twice, first to find out what each tasks produces (line 8), and then again with the updated set of carry tags (line 10). This ensures that the reachable tags are overestimated regardless of the execution order.

---

Algorithm 1: The GetRTags (D, w, C) algorithm.

1  initialize global Map R; T ← θ ;
2  if w is a task network then
3      if w = θ then return C ;
4      else if w = (: ordered $t_1$ ... $t_n$ ) then
5          for i = n to 1 do C ← GetRTags(D,$t_i$, C);
6      else if w = (: unordered $t_1$ ... $t_n$ ) then
7          for i = 1 to n do
8              $T_{t_i}$ ← GetRTags(D,$t_i$,θ); T ← $T_{t_i}$ ∪ T ;
9          for i = 1 to n do
10             $C_{t_i}$ ← $\cup_{j=1, j \ne i}^{n} T_j$ UC; GetRTags(D,$t_i$, $C_{t_i}$);
11 else if w is a task then
12     if R[w] is not defined then R[w] ← θ ;
13     else if t is primitive then
14         T ← add-list of an operator that matches;
15     else if t is nonprimitive then
16         M' ← {$m_1$, ..., $m_k$} such that task $m_j$ matches with t ;
17         U' ← {$U_1$, ..., $U_k$} such that $U_i$ = subtask($m_j$) ;
18         foreach $U_i$ ∈ U' do T ← GetRTags(D, $U_i$, C) ∪ T ;
19     R[w] ← R[w] ∪ T ∪ C ;
20 return T ∪ C

---

If w is a task then update its returned value R[w]. If w is primitive, find a set of tags it produces by looking at its add-list. If w is non-primitive then first find all the methods that can be applied to decompose it and their associated task networks. Then take a union of all tags produced by a call to GetRTags for each of these task networks. Note that this algorithm can be updated to deal with recursive tasks by first identifying when loops occur and then by modifying the algorithm to return special tags in place of a recursive task's returned value. A fixed-point algorithm can then be used to remove these special tags and update the values for all tasks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
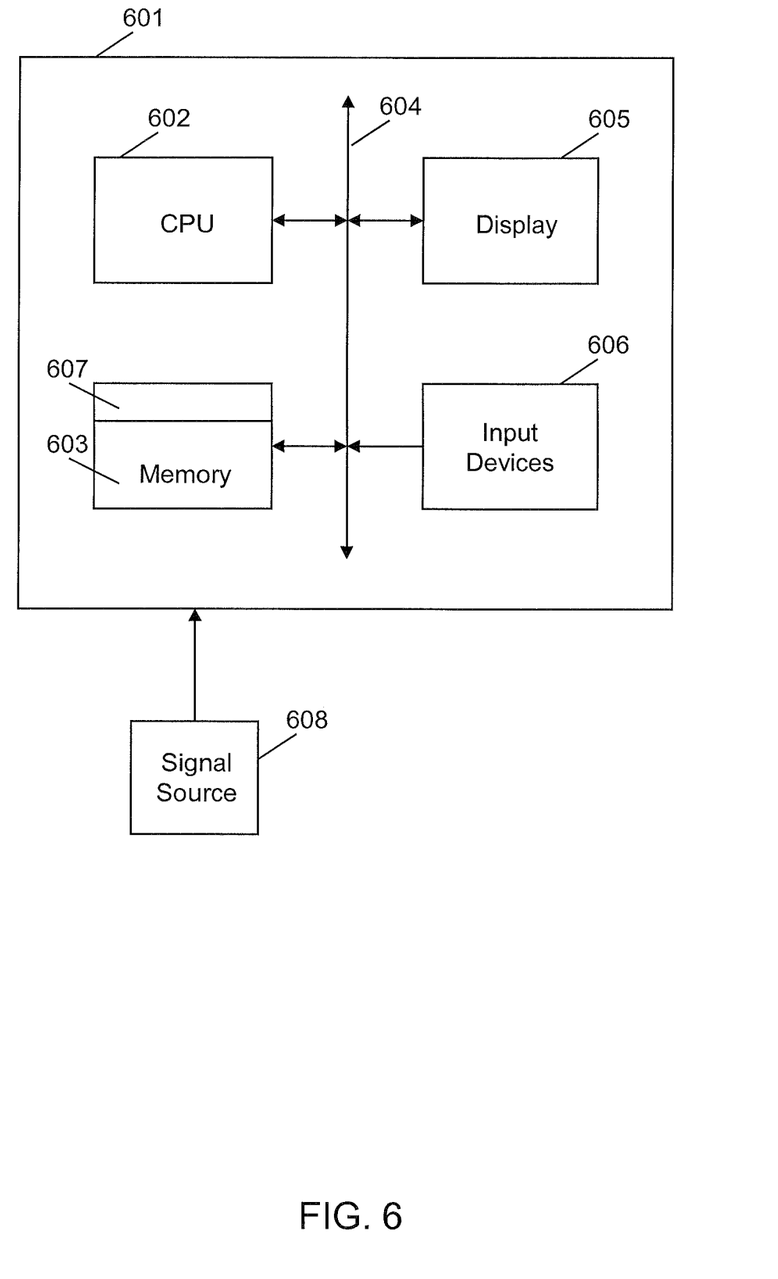
FIG. 6 is a diagram of a computer system for implementing a method according to an exemplary embodiment of the present invention.

Referring now to FIG. 6, according to an exemplary embodiment of the present invention, a computer system 601 can comprise, inter alia, a CPU 602, a memory 603 and an input/output (I/O) interface 604. The computer system 601 is generally coupled through the I/O interface 604 to a display 605 and various input devices 606 such as a mouse and keyboard. The support circuits can include circuits such as cache, power supplies, clock circuits, and a communications bus. The memory 603 can include RAM, ROM, disk drive, tape drive, etc., or a combination thereof. Exemplary embodiments of present invention may be implemented as a routine 607 stored in memory 603 (e.g., a non-transitory computer-readable storage medium) and executed by the CPU 602 to process the signal from the signal source 608. As such, the computer system 601 is a general-purpose computer system that becomes a specific purpose computer system when executing the routine 607 of the present invention.

The computer platform 601 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functions(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for a computer having at least one processor for automated composition of a software application, comprising:
receiving a customizable template for application composition and a composition goal, wherein the goal comprises a plurality of tags and the goal is incomplete such that more than one possible composition matches the goal, wherein the goal is input to the computer by a user;
refining the goal by having the computer processor automatically add refinement tags to the goal, the refinement tags being added to the goal in response to semantics-based decisions; and
generating an application flow that matches the customizable template and the refined goal, wherein the application flow comprises data sources, data processing operators, and outputs of the application flow,
wherein additional semantics-based decisions take place before the application flow is generated and tag semantics are leveraged and cross-correlated with other available information during refinement of the goal.

2. The method of claim 1, further comprising:
determining that the received goal is incomplete;
determining a plurality of alternative refinements for the goal;
ranking the alternative refinements; and
receiving a selection of at least one of the alternative refinements to be added as a refinement tag to the goal.

3. The method of claim 2, wherein the alternative refinements are based on user preferences.

4. The method of claim 3, further comprising:
inferring the user preferences based on a context of the application flow.

5. The method of claim 3, further comprising:
inferring the user preferences by association rule mining based on previously submitted goals.

6. The method of claim 2, further comprising:
translating the customizable template and the refined goal into a Hierarchical Task Network (HTN) planning problem;
solving the HTN planning problem with an HTN planner; and
translating an output result of the HTN planner back into the application flow that matches the customizable template and the refined goal.

7. The method of claim 6, wherein translating the customizable template and the refined goal into an HTN planning problem further comprises:
translating the customizable template into a planning domain;
translating the refined goal into a problem description and a preference encoding the refined goal;
generating a heuristic function that maps elements in the application flow to a plurality of achievable tags into a unified plan for composing the application; and
generating a plurality of software components for the application flow based on the heuristic function.

8. A computer program product for automated composition of a software application, the computer program product comprising:
a non-transitory computer readable storage medium having computer readable program code embodied therewith, the computer readable program code comprising:
computer readable program code configured to receive a customizable template for application composition and a composition goal, wherein the goal comprises a plurality of tags and the goal is incomplete such that more than one possible composition matches the goal, wherein the goal is input to the computer by a user;
computer readable program code configured to refine the goal by having the computer processor automatically add refinement tags to the goal, the refinement tags being added to the goal in response to semantics-based decisions; and
computer readable program code configured to generate an application flow that matches the customizable template and the refined goal, wherein the application flow comprises data sources, data processing operators, and outputs of the application flow,
wherein additional semantics-based decisions take place before the application flow is generated and tag semantics are leveraged and cross-correlated with other available information during refinement of the goal.

9. The computer program product of claim 8, further comprising:
computer readable program code configured to determine that the received goal is incomplete;

computer readable program code configured to determine a plurality of alternative refinements for the goal;

computer readable program code configured to rank the alternative refinements; and computer readable program code configured to receive a selection of at least one of the alternative refinements to be added as a refinement tag to the goal.

10. The computer program product of claim 9, wherein the alternative refinements are based on user preferences.

11. The computer program product of claim 10, further comprising:

computer readable program code configured to infer the user preferences based on a context of the application flow.

12. The computer program product of claim 10, further comprising:

computer readable program code configured to infer the user preferences by association rule mining based on previously submitted goals.

13. The computer program product of claim 9, further comprising:

computer readable program code configured to translate the customizable template and the refined goal into a Hierarchical Task Network (HTN) planning problem;

computer readable program code configured to solve the HTN planning problem with an HTN planner; and computer readable program code configured to translate an output result of the HTN planner back into the application flow that matches the customizable template and the refined goal.

14. The computer program product of claim 13, wherein the computer readable program code configured to translate the customizable template and the refined goal into an HTN planning problem further comprises:

computer readable program code configured to translate the customizable template into a planning domain;

computer readable program code configured to translate the refined goal into a problem description and a preference encoding the refined goal;

computer readable program code configured to generate a heuristic function that maps elements in the application flow to a plurality of achievable tags into a unified plan for composing the application; and computer readable program code configured to generate a plurality of software components for the application flow based on the heuristic function.

15. A system for a computer having at least one processor for automated composition of a software application, comprising:

a memory device for storing a program; and a processor in communication with the memory device, the processor operative with the program to:

receive a customizable template for application composition and a composition goal, wherein the goal comprises a plurality of tags and the goal is incomplete such that more than one possible composition matches the goal, wherein the goal is input to the computer by a user;

refine the goal by having the computer processor automatically add refinement tags to the goal, the refinement tags being added to the goal in response to semantics-based decisions; and generate an application flow that matches the customizable template and the refined goal, wherein the application flow comprises data sources, data processing operators, and outputs of the application flow, wherein additional semantics-based decisions take place before the application flow is generated and tag semantics are leveraged and cross-correlated with other available information during refinement of the goal.

16. The system of claim 15, wherein the processor is further operative with the program to:

determine that the received goal is incomplete;

determine a plurality of alternative refinements for the goal;

rank the alternative refinements; and receive a selection of at least one of the alternative refinements to be added as a refinement tag to the goal.

17. The system of claim 16, wherein the alternative refinements are based on user preferences.

18. The system of claim 17, wherein the processor is further operative with the program to:

infer the user preferences based on a context of the application flow.

19. The system of claim 17, wherein the processor is further operative with the program to:

infer the user preferences by association rule mining based on previously submitted goals.

20. The system of claim 16, wherein the processor is further operative with the program to:

translate the customizable template and the refined goal into a Hierarchical Task Network (HTN) planning problem;

solve the HTN planning problem with an HTN planner; and translate an output result of the HTN planner back into the application flow that matches the customizable template and the refined goal.

21. The system of claim 17, wherein when translating the customizable template and the refined goal into an HTN planning problem the processor is further operative with the program to:

translate the customizable template into a planning domain;

translate the refined goal into a problem description and a preference encoding the refined goal;

generate a heuristic function that maps elements in the application flow to a plurality of achievable tags into a unified plan for composing the application; and generate a plurality of software components for the application flow based on the heuristic function.

* * * * *